(12) United States Patent
Stearns

(10) Patent No.: US 11,018,460 B1
(45) Date of Patent: May 25, 2021

(54) TELEPHONE JACK BRACKET AND MASKING DEVICES FOR MOUNTING ON SAME

(71) Applicant: Donna Stearns, Falmouth, MA (US)

(72) Inventor: Donna Stearns, Falmouth, MA (US)

( * ) Notice: Subject to any disclaimer, the term of this patent is extended or adjusted under 35 U.S.C. 154(b) by 0 days.

(21) Appl. No.: 16/674,392

(22) Filed: Nov. 5, 2019

(51) Int. Cl.
| | |
|---|---|
| H01R 13/60 | (2006.01) |
| H01R 13/66 | (2006.01) |
| F16M 13/02 | (2006.01) |
| H01R 24/62 | (2011.01) |
| H01R 13/73 | (2006.01) |
| H02J 7/00 | (2006.01) |
| H01R 107/00 | (2006.01) |

(52) U.S. Cl.
CPC ......... *H01R 13/6675* (2013.01); *F16M 13/02* (2013.01); *H01R 13/73* (2013.01); *H01R 24/62* (2013.01); *H02J 7/00* (2013.01); *H02J 7/0045* (2013.01); *H01R 2107/00* (2013.01); *H02J 2207/20* (2020.01)

(58) Field of Classification Search
CPC ........ H01R 25/00; H01R 24/54; H01R 31/06; H01R 33/88; H01R 33/94; H01R 25/006
USPC .................................. 439/536, 638; 174/66
See application file for complete search history.

(56) References Cited

U.S. PATENT DOCUMENTS

| | | | |
|---|---|---|---|
| 4,425,725 A | 1/1984 | Moustakas | |
| 4,780,573 A | 10/1988 | Own | |
| 4,800,239 A | 1/1989 | Hill | |
| 4,876,713 A * | 10/1989 | Crosby | H01R 13/6666 379/412 |
| 5,539,821 A | 7/1996 | Blonder | |
| 5,675,125 A | 10/1997 | Hollinger | |
| 5,735,708 A | 4/1998 | Arnett | |
| 6,026,605 A | 2/2000 | Tippett | |
| 7,071,414 B2 | 7/2006 | Kim | |
| 7,425,681 B2 | 9/2008 | Xu | |
| 7,654,855 B2 * | 2/2010 | Liao | H01R 13/60 439/441 |
| 7,785,138 B2 | 8/2010 | Bonnassieux | |
| 8,415,920 B2 * | 4/2013 | Liao | H01R 31/065 320/111 |
| 8,542,819 B2 * | 9/2013 | Hazani | H01R 13/719 379/413.02 |
| 8,653,364 B2 | 2/2014 | Roban | |
| 8,655,364 B2 * | 2/2014 | Kitani | H04W 60/005 455/436 |
| 9,048,647 B2 | 6/2015 | Myers | |
| 9,337,676 B2 * | 5/2016 | Benigno | H02J 7/0042 |

(Continued)

FOREIGN PATENT DOCUMENTS

| | | |
|---|---|---|
| FR | 3 066 654 | 11/2018 |
| WO | 2015128535 | 9/2015 |

*Primary Examiner* — Phuong K Dinh

(74) *Attorney, Agent, or Firm* — Lambert Shortell & Connaughton; Gary E. Lambert; David J. Connaughton, Jr.

(57) ABSTRACT

The present disclosure relates to telephone jack covering systems that advantageously render existing telephone jacks more attractive and useful. The systems disclosed include a novel bracket that allows for existing telephone jacks to be covered with decorative and functional devices. In a preferred embodiment, an existing telephone jack is outfitted with a bracket and covered with a converter device that converts the existing telephone jack into a smart device charging station.

20 Claims, 6 Drawing Sheets

(56) References Cited

U.S. PATENT DOCUMENTS

| | | | |
|---|---|---|---|
| 2008/0012423 A1* | 1/2008 | Mimran | H01R 31/065 307/11 |
| 2009/0020307 A1 | 1/2009 | Roach | |
| 2009/0126968 A1 | 5/2009 | Glas | |
| 2013/0244475 A1 | 9/2013 | Sayadi | |
| 2013/0265694 A1 | 10/2013 | Texter | |
| 2014/0203757 A1 | 7/2014 | Ibragimova | |
| 2014/0362559 A1 | 12/2014 | Chien | |
| 2017/0324200 A1 | 11/2017 | Gorin | |

* cited by examiner

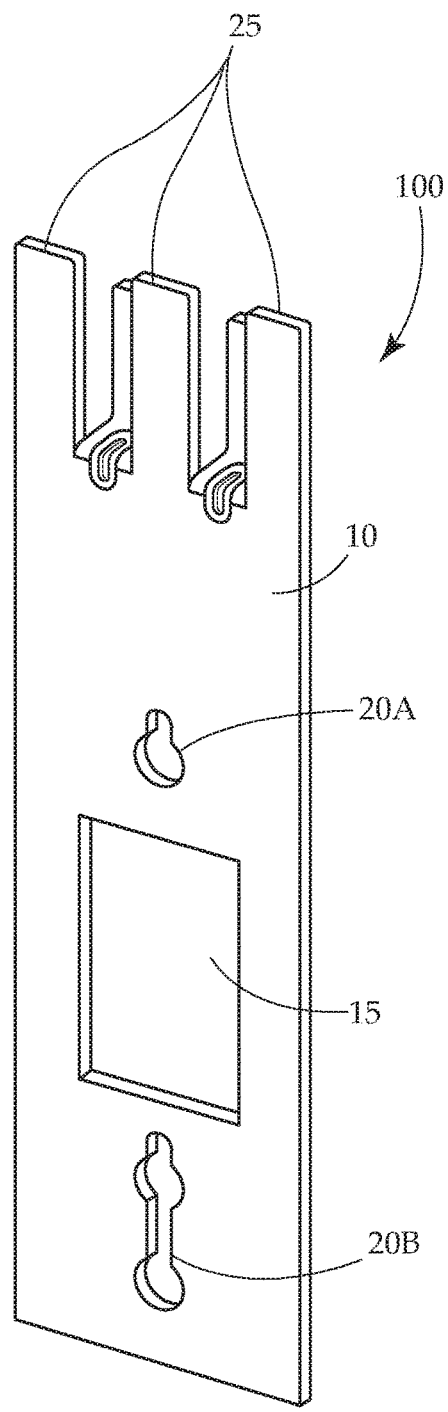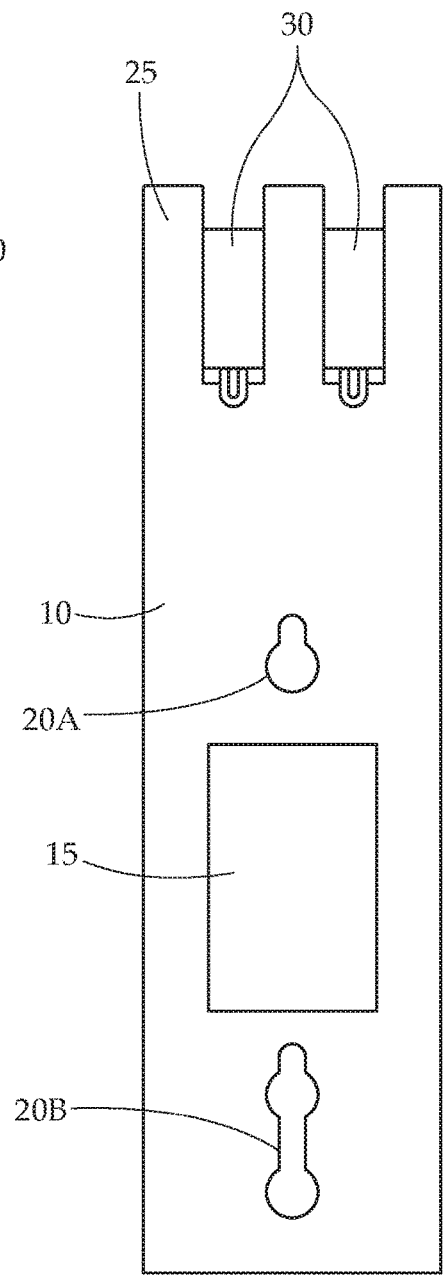
Fig. 3A    Fig. 3B    Fig. 3C

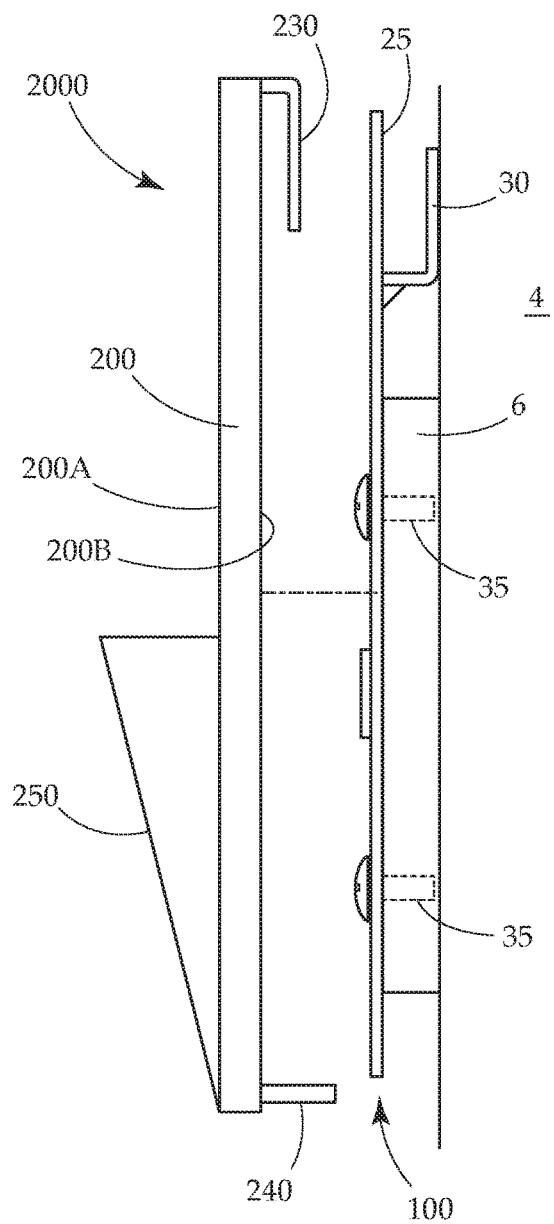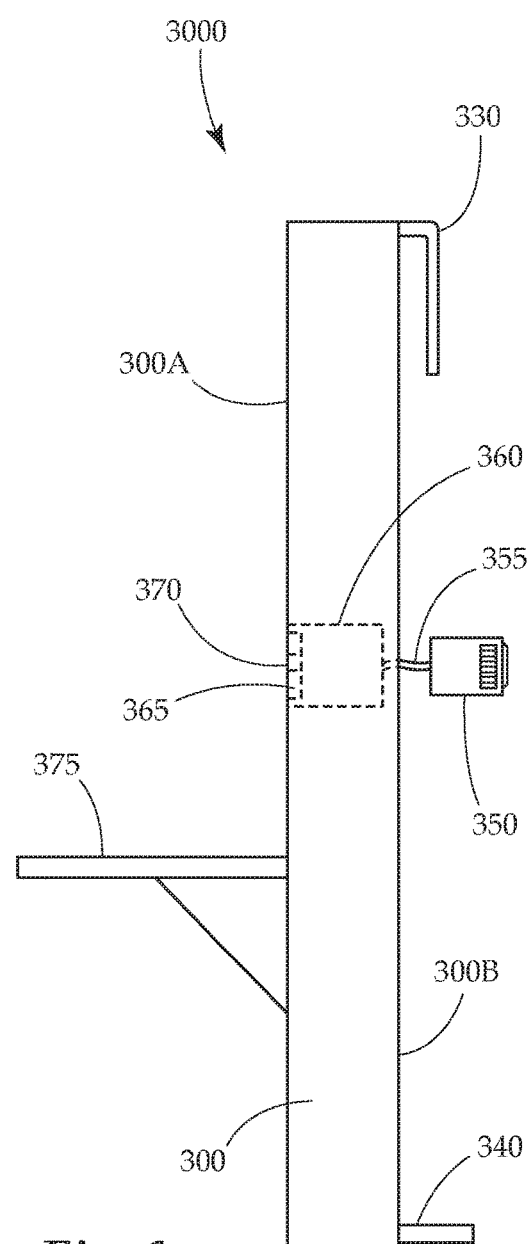
Fig. 5
Fig. 6

TELEPHONE JACK BRACKET AND MASKING DEVICES FOR MOUNTING ON SAME

FIELD OF DISCLOSURE

The present disclosure relates to modification of existing telephone jacks, and more specifically, to modifying said jacks to make them more attractive and useful to modern home-owners and renters. In accordance with the disclosure, various telephone jack covers are disclosed that modify the telephone jack to provide functions advantageous and desirable functions to a user.

BACKGROUND

Most residences are still equipped telephone jacks. The use of wired telephones have, however, become obsolete in the wake of cell phones. Individuals rarely, if ever, use "land lines," in their residence and instead favor the exclusive use of their cell phones. Telephone jacks are thus mainly considered an unsightly relic of the past and an eye sore to today's modern residents. Most residents would much rather that their telephone jacks, particularly those in visible and high traffic places, simply not exist or be replaced with something more useful. There thus exists a need for a device able to both mask existing telephone jacks and make them useful to modern consumers.

SUMMARY OF DISCLOSURE

The present disclosure relates to systems for covering existing telephone jacks. In accordance with aspects and embodiments a bracket is provide that fits over existing telephone jacks and mates with decorative and functional devices that mask the existing jack.

In accordance with a first aspect, a telephone jack masking system is disclosed comprising a telephone jack fixed to a wall by a telephone jack covering, a bracket attached to the telephone jack covering; a masking device attached to the bracket and having a front face and a back, the front face having one of a decorative feature, a functional feature, or a combination thereof. In accordance with embodiments, the masking device may include a decorative feature including but not limited to a picture frame, a piece of art, or a mirror. In accordance with embodiments, the masking device may include a functional feature, including but not limited to one or more shelves, one or more hooks, one or more file folders, a jewelry or accessory holder, or a cork board, white board, or other message board. In accordance with other embodiments, the masking device may include a combination of decorative and functional features.

In accordance with embodiments, the telephone jack coverings may be fixed to the wall by a pair of screws that pass through a set of holes in the covering, and the brackets of the disclosure may have a corresponding set of through holes that align with the junction box holes. This may advantageously allow the brackets of the disclosure to be fixed to the telephone jack coverings without having to form additional holes in the wall surrounding the telephone jack.

The brackets of the present disclosure may further define a telephone jack frame between the bracket through holes such that when installed on the telephone jack covering, the telephone jack is unobstructed. The brackets may further comprise mounting fingers and the bracket mounting fingers may engage with a corresponding mounting hook of the masking devices of the disclosure. The masking devices contemplated by the disclosure may include a stabilization arm to ensure the devices remain a fixed distance from the bracket and/or wall.

In accordance with aspects and embodiments, a telephone jack charging system is disclosed, the system comprising a telephone jack fixed to a wall by a telephone jack covering, a bracket attached to the telephone jack covering, and a converter device attached to the bracket, where the converter device has a front face and a back face, and the back face has extending therefrom a telephone plug plugged into the telephone jack and the front face has a female USB port. In accordance with embodiments, the converter device comprises a voltage converter that converters voltage in the telephone jack line to current usable by a device plugged into the USB port. In accordance with aspects and embodiments, the converter device further comprises a shelf that extends from the front face and where a smart device can be stored while being charged.

BRIEF DESCRIPTION OF THE DRAWINGS

FIG. 3A is a side view of a bracket in accordance with aspects and embodiments;

FIG. 3B is a profile view of a bracket in accordance with aspects and embodiments;

FIG. 3C is a front view of a bracket in accordance with aspects and embodiments;

FIG. 5 is an exploded side view of a masking device installed on a bracket installed on an existing telephone jack in accordance with aspects and embodiments;

FIG. 6 is a side view of a converter masking device in in accordance with aspects and embodiments.

DETAILED DESCRIPTION

The present disclosure relates to devices for covering and modifying existing telephone jacks. The telephone jacks covered and modified by the devices of the present disclosure may be located in any type of building, and may for example be in a residence, but the devices disclosed herein are suitable for telephone jacks in office and commercial spaces.

Figure 1:
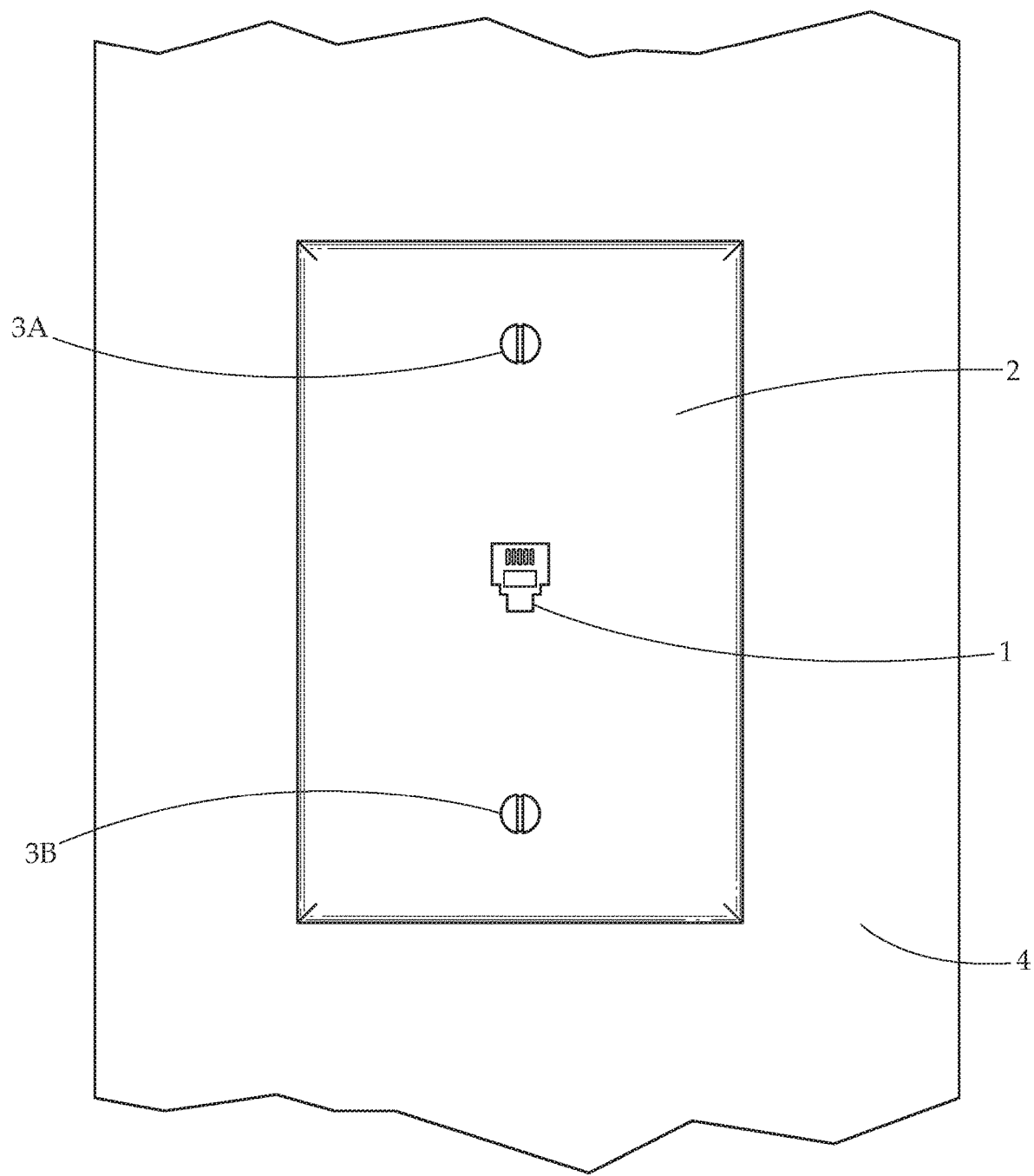
FIG. 1 is a front view of an existing telephone jack configuration.

Telephone jacks may exist in a variety of configurations, including for example, jacks that are substantially flush with the wall and jacks that are in boxes protruding from the wall. The jacks themselves are fixed to the wall by telephone jack coverings, and these coverings may for example by wall plates or junction boxes. These coverings are further fixed to the wall by screws that pass through the covering and into the wall. Though jack configurations may vary, the jacks themselves are standardized, and most jacks receive a standard telephone plug. The most commonly used plus is an RJ11 modulator connector. FIG. 1 shows a telephone jack configuration substantially flush with a surrounding wall. The telephone jack 1 is surrounded by wall plate 2, which is fixed on wall 4 by screws 3A that pass through wall plate 2 through holes 3B and into wall 4.

Figure 2:
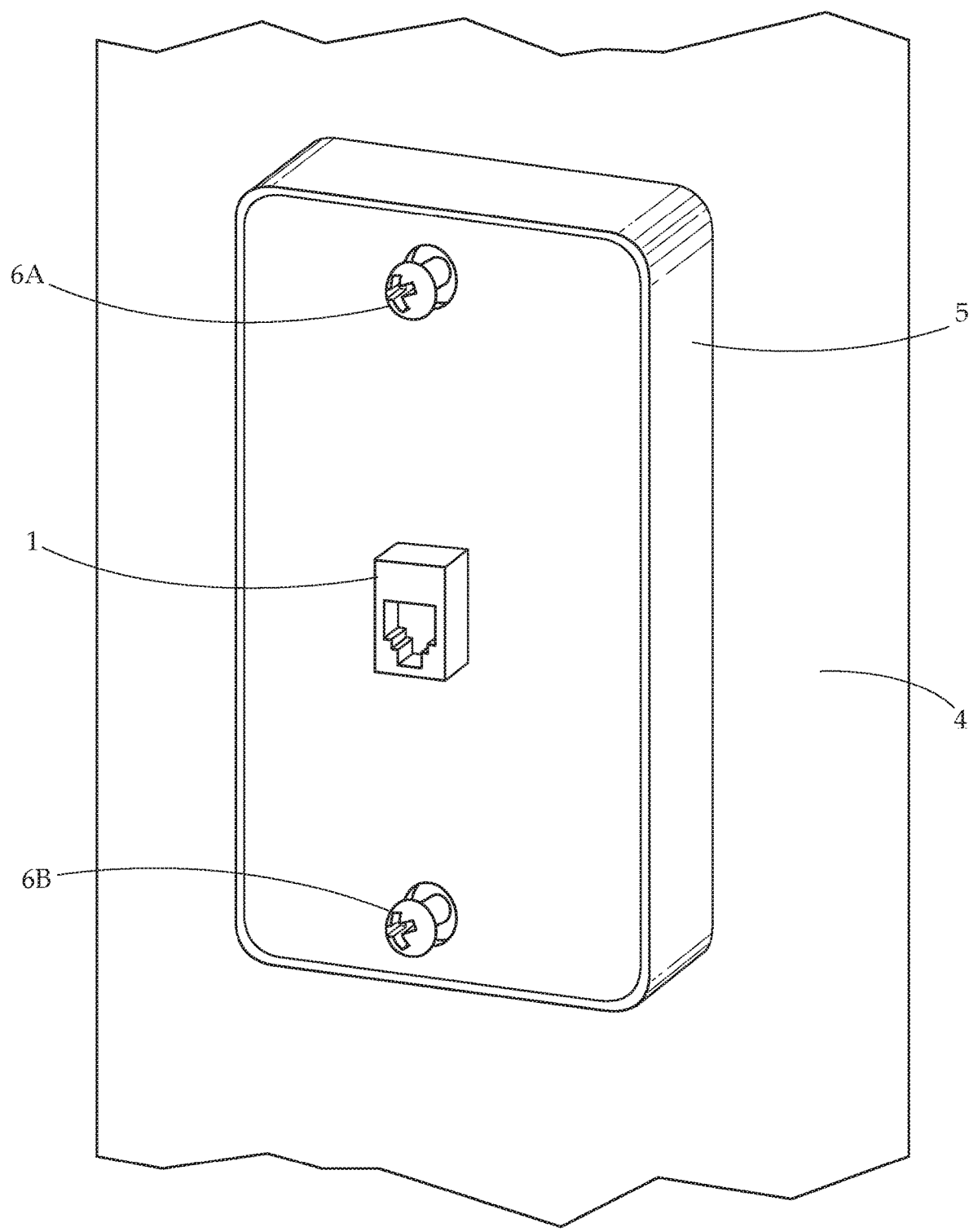
FIG. 2 is a side view of an existing telephone jack configuration.

FIG. 2 shows a telephone jack configuration that protrudes from the wall. The configuration shown in FIG. 2 is often associated with older telephone jacks and thus older construction and older homes. Telephone jack 1 is in junction box 5. Box 5 is affixed to wall 4 with junction box screws 6A that pass through junction box holes 6B.

In a first aspect of the disclosure, a bracket is disclosed that is configured to fit over junction box 5. The bracket that fits over junction box 5 can then be used to hang any number of masking devices having decorative and functional features.

Referring to FIGS. 3A-3C, bracket 100 is disclosed. Bracket 100 has front plate 10 having a top end having mounting fingers 25 opposite a bottom end. Front plate 10 has a front face 10A and a back face 10B. Front plate 10 has through holes 20A and 20B positioned above and below jack frame 15, respectively, with through hole 20B positioned proximate the bottom end of front plate 10. Bracket 100 has mounting arms 30 that extend from back face 10B of front plate 10 at substantially a right angle.

Mounting arms 30 extend from the back face 10B of front plate 10 a distance substantially equal to that of a standard telephone junction box that protrudes from a wall, for example, the configuration of a telephone jack shown in FIG. 2. Through holes 20A and 20B align with junction box holes 5B and telephone jack frame 15 aligns with junction box 5 and telephone jack 1 such that front plate 10 of bracket 100 can sit flush on junction box 5 with mounting arms 30 contacting wall 4.

Figure 4:
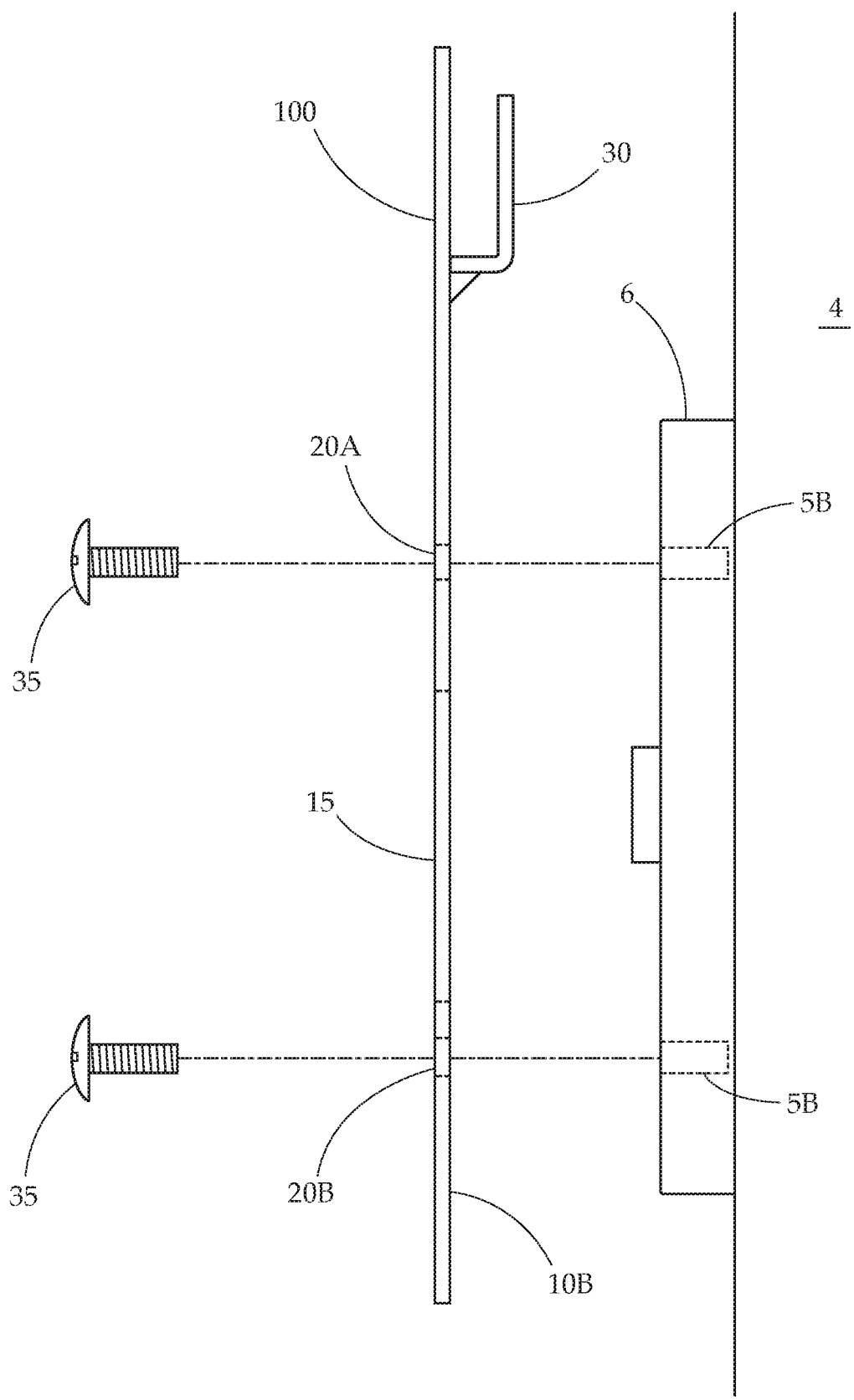
FIG. 4 is an exploded side view of a bracket installed on an existing telephone jack in accordance with aspects and embodiments.

Referring now to FIG. 4, mounting bracket 4 can be fixed to wall 4 and over junction box 5. In a first step, screws 5A are removed, exposing junction box holes 5B. Bracket 100 is positioned over junction box 6 such that back face 10B of front plate 10 is flush with junction box 6 and through holes 20A and 20B are aligned with junction box holes 5B. The vertical components of mounting arms 30 sit flush with wall 4. Fixing screws 35 pass through the front face 10A of front plate 10 via through holes 20A and 20B, through front plate 10, into junction box 6 through holes 5B, and into wall 4, securing bracket 100 to wall 4 via junction box 6. Through holes 20A and 20B may be larger than the junction box holes 6B. For example and as shown in FIG. 4, through hole 20B has an oblong shape. The extended shape of through hole 20B thus allows bracket 100 to be affixed to a variety of junction boxes. The shape of through holes 20A and 20B may therefore facilitate the affixing of bracket 100 onto junction boxes of various eras having junction box holes 6B spaced from one another in a variety of distances.

Bracket 100 thus advantageously mounts to telephone jacks via wall coverings without having to make holes into the surrounding wall. If only a single screw is present in a given telephone jack covering, a single bracket fixing screw can be used a second fixing screw can be fixed into the wall, if necessary. Configurations of bracket 100 may be further varied to accommodate different geometries of different telephone jack coverings.

Still referring to FIG. 4, telephone jack frame 15 of bracket 100 surrounds telephone jack 1 and leaves telephone jack 1 unobstructed by bracket 100. Bracket 100 can also be used over a telephone jack that is substantially flush with the wall having an identical manner as shown in FIG. 4, on for example, the configuration shown in FIG. 1. The degree to which bracket arm 39 extends perpendicularly from back face 10B may be varied to accommodate different types of telephone jack wall coverings. Additionally, when bracket 100 is being used over a flush junction box, bracket 100 can be such that fingers 25 protrude outwardly and mounting arms 30 are flush with the wall.

Referring to FIG. 5, once bracket 100 is installed, a masking device can be mounted on bracket 100 via fingers 25. Masking device 2000 has main body 200 having from face 200A and back face 200B. Masking device 2000 has mounting hook 230 that extends from the back face 200B at the top of body 200 that has a corresponding and inverse geometry to the space defined by mounting fingers 25 and mounting arms 30 of bracket 100. Mounting hook 230, when mounted on bracket 100, hooks onto mounting fingers 25. Masking device 2000 may comprise more than one mounting hook 230. Masking device 2000 may further include stabilizing arm 240 that extends from the back face 200B of main body 200 to keep masking device 2000 at a fixed distance from bracket 100 or wall 4. Device 2000 may include more than one stabilizing arm 240 and stabilizing arm 240 may extend from a position towards the bottom end of main body 200 opposite the end from which mounting hook 230 is located.

Masking devices 2000 of the present invention may include mounting tubes (not shown) that individually receive mounting arms 30 and/or fingers 25, depending on the orientation of mounting of bracket 100. The mounting portion of masking device 2000 may for example span a portion or the entire width of device 2000. The mounting portion may include several mounting tubes positioned in parallel to one another. The tubes may take the form of slots that closely mirror the size and shape of mounting arms 30/fingers 25. When device 2000 is mounted on bracket 100, only certain successive mounting tubes will receive mounting arms 30/fingers 25. This mounting feature enables device 2000 to be mounted on bracket 100 such that junction box 6 is not centered behind device 2000. For example, device 2000 may be mounted on bracket 100 at a far left or right, while still being held straight up and down by the mounting arms 30/fingers 25 which are engaged with the mounting tubes at the far left or right. This facilitates the positioning of mounting device 2000 on wall 4 in a variety of configurations and ensures that mounting device 2000 can be positioned in a manner that is most aesthetically pleasing and/or most accessible.

Masking device 2000 may include on front face 200A a decorative feature including but not limited to a picture frame, a piece of art, a mirror, or any other non-functional feature designed to enhance the aesthetic appeal of the telephone jack/the décor of the room in which it is located. Alternatively, Masking device 2000 may include on front face 200A a functional feature including but not limited to a file folder, a shelf, a hook or plurality of hooks, a jewelry or accessory holder, a magnetic board, a cork board, a white board or other message board, or any feature or set of features selected to provide a user with a desired functionality. For example and as shown in FIG. 5, masking device 2000 includes on front face 200A a file folder 250. File folder 250 may, for example, be used for storing and sorting mail, receipts, and other paperwork.

Masking device 2000 may, in accordance with embodiments, include combinations of both decorative and functional features. In a non-limiting example, Masking device 2000 may have a file folder, shelf, and hooks extending from surface 200A that may be used to sort mail, hold small items, and store keys. Masking device 2000 may further include on front face 200A a mirror or picture frame, as well. It will be appreciated by those of skill in the art that masking device 2000 can include any number of decorative and functional features without departing from the spirit and scope of the disclosure. These features may be selected by the user based in part on where the telephone jack the user seeks to mask is located. For example, a user masking a telephone jack in a kitchen may mask the jack with a device 2000 having a corkboard on front face 2000A suitable for pinning recipes. A user masking a telephone jack a eye level in their entry way may select a device 2000 having features suitable for mail sorting, and a user masking a telephone jack that is largely inaccessible may select a device 2000 with a purely decorative art piece on outer surface 200A.

In accordance with further aspect, a system is disclosed for converting a standard telephone jack into a system having a mounting bracket and masking device, where the masking device draws power. For example, in accordance with embodiments, a system is disclosed for converted a standard telephone jack into a USB charging port for a smart device. Alternatively, the jack may be used to power any other device, for example and including a small light. The light may, for example, be used as a nightlight or to illuminate an area not otherwise well-lit. In some embodiments, masking devices that convert standard telephone jacks into a power sources may be decorative and make use of the power source. A masking device may for example include a decorative feature, for example and including a piece of artwork, and may also include a powered feature, for example and including a light that is powered by the jack and illuminates the artwork.

Phone jacks receive power through dedicated wires. When the jack is not in use, i.e., a phone is not plugged into it and the number assigned to the phone jack is not receiving a call, the jack receives a constant direct current signal of about 50-60 volts. when a telephone line receives a telephone call, the signal is about 20 hertz AC. Smartphones, for example, requires about 5 volts to charge, and thus the voltage that runs through a phone jack provides more than enough electricity to charge a smart phone. By reducing the voltage output of the phone line with a voltage regulator, the telephone jack can be converted into a suitable charging station for a smart device. In some embodiments, the voltage regulator may include additional components, including for example a diode, to ensure that the converter is able to handle the AC signal incurred by the line if an incoming call is received.

Referring to FIG. 6, a converter masking device 3000 is shown. Converting masking device 3000 has main body 300 having front face 300A and back face 300B. Main body 300 has at its top end mounting hook 330 for mounting on a bracket and main body 300 has at its bottom end stabilizing arm 340 to keep device 3000 at a fixed distance from either a bracket or the wall. Device 3000 has extending from the back face 300B of main body 300 telephone plug 350. Telephone plug 350 is connected to converter box 360 via wire 355. Converter box 360 is encased in main body 300. Convert 360 may, for example, be a voltage converter. Converter 360 is in electrical communication with USB adapter 365. USB adapter 365 is also fully encased in main body 300 but has female USB port 370 on the surface of 300A. Voltage converter 360 may include resisters and diodes and any other electrical components necessary to ensure proper and safe charging of a device plugged into USB port 365. Voltage converter 360 may convert the voltage traveling through the phone line into any desired voltage. Different devices may require different voltages for charging and converter 360 may be selected based on needs of the end user. Device 3000 may further include shelf 375 that extends from front surface 300A of main body 300 that may, for example, be used to store a smart device when being charged via USB port 365.

Figure 7:
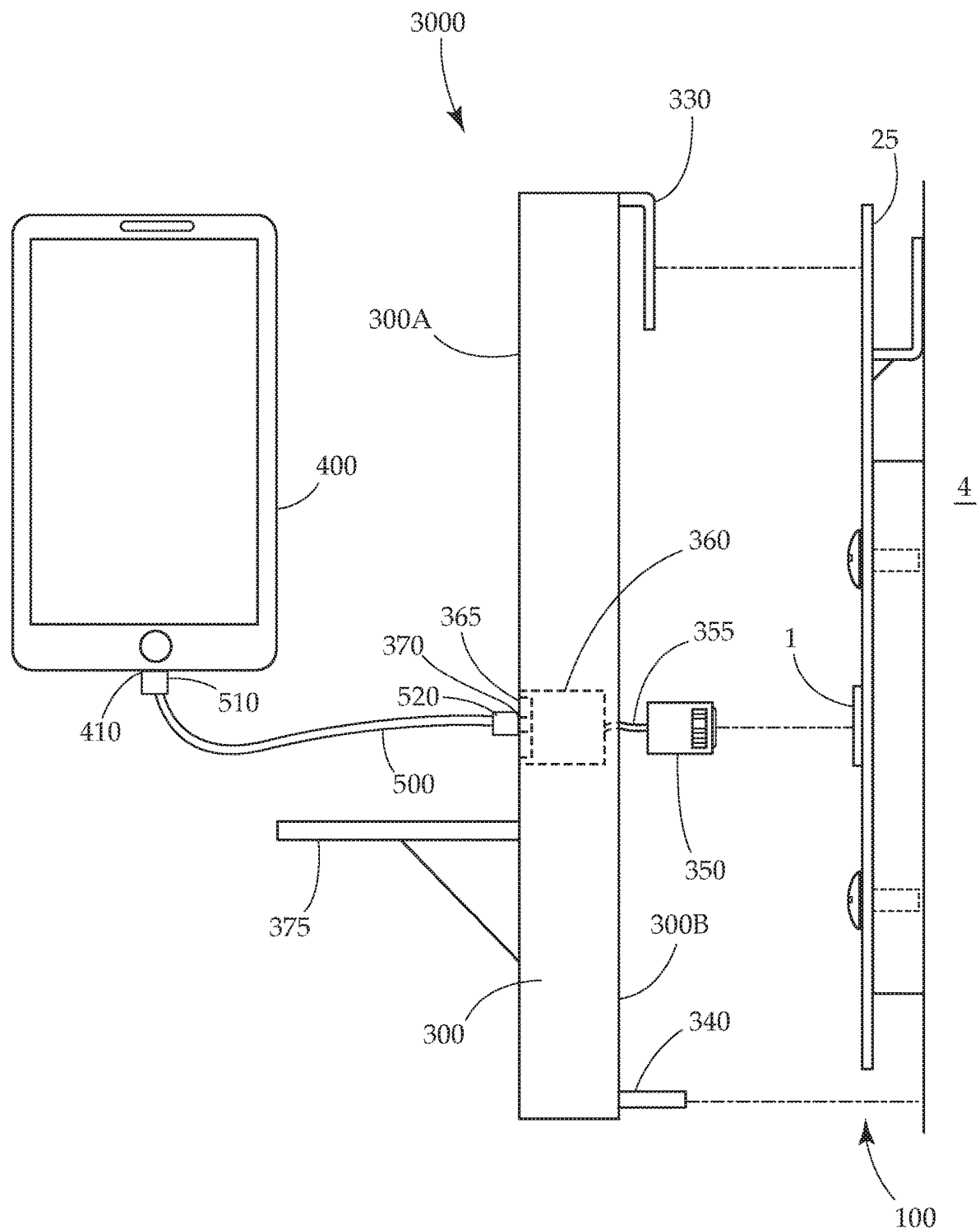
FIG. 7 is an exploded side view of a smartphone connected to converter masking device masking device in in accordance with aspects and embodiments.

When installed and in operation, and turning to FIG. 7, converter masking device 3000 engages with both telephone jack 1 and bracket 100. Bracket 100 connects to box 5 via screw holes 6B and is fixed to box 5 via fixing screws 35 that pass through 20A and 20B, through box 5 and into wall 5. Telephone jack frame 15 of bracket 100 leaves telephone jack 1 unobstructed by bracket 100. Telephone plug 350 of converter masking device 3000 plugs into telephone jack 1. Converter device 3000 then hooks onto bracket 100 via mounting hook 330. Mounting hook 330 engages with mounting fingers 25 of bracket 100. Stabilizing arm 340 abuts wall 4, ensuring device 3000 stays positioned a fixed distance from wall 4.

Smartphone 400 is then charged via converter masking device 3000. USB cable 500 having an end 510 compatible with smart phone charging port 410 is connected to smartphone 400 by smartphone charging port 410. USB cord 500 having male USB end 520 is then inserted into female USB port 370. Converter 360 converts current from the lines of telephone jack 1 into usable current for USB charging, enabling smartphone 400 to charge. Smartphone 400 rests on shelf 375 while charging. Although certain representative embodiments and advantages have been described in detail, it will be apparent to those skilled in the art that various modifications and variations can be made in the present disclosure without departing from the scope or spirit of the disclosure. Other embodiments of the disclosure will be apparent to those skilled in the art from consideration of the specification and practice of the apparatuses and methods disclosed herein. It is intended that the specification and examples be considered as exemplary only.

What is claimed is:

1. A telephone jack charging system comprising:
   a telephone jack fixed to a wall by a telephone jack covering;
   a bracket attached to the telephone jack covering, the bracket attached by at least one fixing screw that passes through the telephone jack covering, wherein the at least one fixing screw replaces at least one telephone jack covering screw and the fixing screw fixes the telephone jack covering to the wall;
   a converter device attached to the bracket and having a front face and a back face, the back face having extending therefrom a telephone plug that is plugged into the telephone jack, the front face having thereon a female USB port, wherein the converter device comprises a voltage converter electrically connected to a USB adapter, which provides a proper charging voltage to the female USB port.

2. The system of claim 1, wherein the converter device further comprises a shelf extending from the front face.

3. The system of claim 2, wherein the bracket is fixed to the wall via the telephone jack wall covering only.

4. The system of claim 3, wherein the bracket further defines a telephone jack frame between a set of bracket through holes.

5. The system of claim 4, wherein the bracket comprises mounting fingers.

6. The system of claim 5, wherein the converter device comprises a mounting hook that engages with the mounting fingers to attach the converter device to the bracket.

7. The system of claim 6, wherein the converter device further comprises a stabilizing arm.

8. A telephone jack masking system comprising:
a telephone jack fixed to a wall by a telephone jack covering;
a bracket comprising a plurality of mounting fingers and at least one through hole, the bracket attached to the telephone jack covering by at least one fixing screw that passes through the at least one through hole and the telephone jack covering, where the at least one fixing screw replaces at least one telephone jack covering screw and the fixing screw fixes the telephone jack covering to the wall; and
a masking device attached to the bracket by engaging with the mounting fingers and having a front face and a back face, the front face having one of a decorative feature, a functional feature, or a combination thereof.

9. The system of claim 8, wherein the front face of the masking device comprises a picture frame.

10. The system of claim 8, wherein the front face of the masking device comprises a piece of art.

11. The system of claim 8, wherein the front face of the masking device comprises a message board.

12. The system of claim 8, wherein the front face of the masking device comprises a file folder.

13. The system of claim 12, wherein the front face of the masking device further comprises a shelf.

14. The system of claim 13, wherein the front face of the masking device further comprises hooks.

15. The system of claim 8, wherein the bracket is fixed to the wall via the telephone jack wall covering only.

16. The system of claim 8, wherein the masking device comprises at least one mounting hook that engages with the mounting fingers to attach the masking device to the bracket.

17. The system of claim 16, wherein the masking device further comprises a stabilizing arm.

18. The system of claim 16, wherein the masking device comprises a file folder, a shelf, and a plurality of hooks.

19. The system of claim 8, wherein the mounting fingers extend away from the bracket.

20. The system of claim 8, wherein the masking device comprises at least one mounting tube that engages with at least one mounting finger to attach the masking device to the bracket.

* * * * *